(12) United States Patent
Frisch et al.

(10) Patent No.: US 12,196,240 B2
(45) Date of Patent: Jan. 14, 2025

(54) PLASTIC HOUSING DEVICE FOR AN INDIRECT SCREW CONNECTION FOR A MOTOR VEHICLE

(71) Applicant: Continental Automotive GmbH, Hannover (DE)

(72) Inventors: Johann Frisch, Ruhpolding (DE); Rudolf Hildebrand, Holzkirchen (DE)

(73) Assignee: Continental Automotive GmbH, Hannover (DE)

( * ) Notice: Subject to any disclaimer, the term of this patent is extended or adjusted under 35 U.S.C. 154(b) by 318 days.

(21) Appl. No.: 17/770,905

(22) PCT Filed: Oct. 22, 2020

(86) PCT No.: PCT/EP2020/079720
§ 371 (c)(1),
(2) Date: Apr. 21, 2022

(87) PCT Pub. No.: WO2021/078843
PCT Pub. Date: Apr. 29, 2021

(65) Prior Publication Data
US 2022/0364589 A1    Nov. 17, 2022

(30) Foreign Application Priority Data
Oct. 24, 2019   (DE) .................... 10 2019 216 409.9

(51) Int. Cl.
*H01Q 1/32* (2006.01)
*B60R 11/02* (2006.01)
(Continued)

(52) U.S. Cl.
CPC .............. *F16B 21/02* (2013.01); *B60R 11/02* (2013.01); *F16B 5/0628* (2013.01); *H01Q 1/12* (2013.01)

(58) Field of Classification Search
CPC .......... B60R 11/00; B60R 11/02; F16B 21/02; F16B 37/04; F16B 37/042; F16B 5/02;
(Continued)

(56) References Cited

U.S. PATENT DOCUMENTS 5,370,488 A    12/1994   Sykes
9,482,261 B2 * 11/2016   Lacroix ................. F16B 37/044
(Continued)

FOREIGN PATENT DOCUMENTS

CN    102734304 A    10/2012
CN    102874316 A    1/2013
(Continued)

OTHER PUBLICATIONS

Office Action dated Aug. 31, 2023 from corresponding Chinese patent application No. 202080075680.7 .
(Continued)

*Primary Examiner* — Tho G Phan

(57) ABSTRACT

The present invention relates to a plastics housing device for indirect screw connection for a motor vehicle, wherein the plastics housing device comprises: at least one positioning element; a clamping element; and a screw element; wherein the at least one positioning element is configured to hold the clamping element in position in form-fitting fashion; wherein the screw element is configured to be pressed against the clamping element by the at least one positioning element and thereby cause a rotation of the clamping element; wherein the clamping element is configured to clamp the plastics housing device to a metal panel by way of the rotation.

7 Claims, 10 Drawing Sheets

(51) Int. Cl.
  *F16B 5/02* (2006.01)
  *F16B 5/06* (2006.01)
  *F16B 21/02* (2006.01)
  *F16B 37/04* (2006.01)
  *H01Q 1/12* (2006.01)

(58) Field of Classification Search
  CPC ....... F16B 5/0233; F16B 5/0628; H01Q 1/12; H01Q 1/32; H01Q 1/3275
  See application file for complete search history.

(56) References Cited

U.S. PATENT DOCUMENTS

| | | | | |
|---|---|---|---|---|
| 10,207,565 | B2 * | 2/2019 | Preis | B60H 1/00564 |
| 11,047,416 | B2 * | 6/2021 | Heinrichs | F16B 5/06 |
| 11,530,717 | B2 * | 12/2022 | Steimer | F16B 21/065 |
| 11,788,572 | B2 * | 10/2023 | Limpert | F16B 37/042 29/525.02 |
| 2013/0014353 | A1 | 1/2013 | Loewe et al. | |

FOREIGN PATENT DOCUMENTS

| | | |
|---|---|---|
| DE | 3900468 A1 | 7/1990 |
| FR | 2923275 A1 | 5/2009 |
| WO | 2011098286 A1 | 8/2011 |

OTHER PUBLICATIONS

International Search Report and Written Opinion dated Dec. 9, 2020 from corresponding International patent application No. PCT/EP2020/079720.

Second Office Action dated Apr. 12, 2024 from corresponding Chinese patent application No. 202080075680.7.

Third Office Action dated Apr. 12, 2024 from corresponding Chinese patent application No. 202080075680.7.

* cited by examiner

PLASTIC HOUSING DEVICE FOR AN INDIRECT SCREW CONNECTION FOR A MOTOR VEHICLE

TECHNICAL FIELD

The present invention relates to a plastics housing device for the indirect screw connection of antenna modules for a motor vehicle.

TECHNICAL BACKGROUND

An (amplifier) module with a plastics housing has, on its underside, an additional metal element (metal cage) which is inserted into a corresponding installation hole in the vehicle (panel) and thus positions and aligns the module.

In addition, within the metal element (metal cage), there is situated a clamping element that is held centrally by a screw. Tightening the screw causes the clamping element to rotate through 45° and move in the direction of the module base (plastics housing), whereby the module is clamped to the vehicle panel.

The additional metal element (metal cage) entails costs and, owing to the type of construction, necessitates cumbersome installation of the clamping element from the side. In addition, owing to the tolerance situation, the screw must be screwed together with the clamping element in advance on the production line (additional costs).

SUMMARY OF THE INVENTION

It is an object of the present invention to provide an improved housing device for a motor vehicle. This object is achieved by the subjects of the independent patent claims.

Embodiments and refinements can be found in the dependent patent claims, the description and the figures of the drawings.

A first aspect of present invention relates to a plastics housing device for indirect screw connection for a motor vehicle, wherein the plastics housing device comprises: at least one positioning element; a clamping element; and a screw element; wherein the at least one positioning element is configured to hold the clamping element in position in form-fitting fashion; wherein the screw element is configured to be pressed against the clamping element by the at least one positioning element and thereby cause a rotation of the clamping element; wherein the clamping element is configured to clamp the plastics housing device to a metal panel by way of the rotation.

The present invention advantageously makes it possible to achieve a cost reduction and a simplification of the installation process on the production line and allow an improvement of the tolerance situation within the module assembly and during the installation process in the vehicle.

The present invention advantageously allows the function of the metal element, also referred to as "metal cage", to be integrated into the plastics housing, also referred to as "housing bottom". With appropriate snap-action hooks on the plastics housing, the clamping element can now be installed in the z-direction and is held in position in form-fitting fashion.

The screw is pressed against the clamping element—thread against thread—by spring tabs in the plastic cover, also referred to as "housing cover", and therefore no prior screwing-together is necessary, because the threads engage immediately when the screw is rotated. Tolerances are compensated for by the spring travel of the tabs.

Advantageous configurations of the present invention are characterized in the dependent claims.

In one advantageous embodiment of the present invention, provision is made for the screw element to be configured to engage with the spring tabs when rotated.

In a further advantageous embodiment of the present invention, provision is made for the plastics housing device to be configured such that tolerances are compensated for by a correspondingly adapted spring travel of the spring tabs attached to the plastics housing device.

In a further advantageous embodiment of the present invention, provision is made for the plastics housing device to be configured to allow the installation of modules in the vehicle.

In a further advantageous embodiment of the present invention, provision is made for the plastics housing device to be configured to push the screw element in one direction.

The described configurations and refinements may be combined with one another as desired.

Further possible configurations, refinements and implementations of the present invention also comprise combinations, which have not been explicitly specified, of features of the present invention that are described above or below with respect to the embodiments.

The accompanying drawings are intended to convey further understanding of the embodiments of the present invention. The accompanying drawings illustrate embodiments and serve, in conjunction with the description, to clarify concepts of the present invention.

Other embodiments and many of the specified advantages become apparent in relation to the figures of the drawings. The illustrated elements of the figures of the drawings are not necessarily shown true to scale with respect to one another.

DETAILED DESCRIPTION OF THE EXEMPLARY EMBODIMENTS

In the figures of the drawings, identical reference designations denote identical or functionally identical elements, assemblies, components or method steps, unless stated otherwise.

Figure 1:
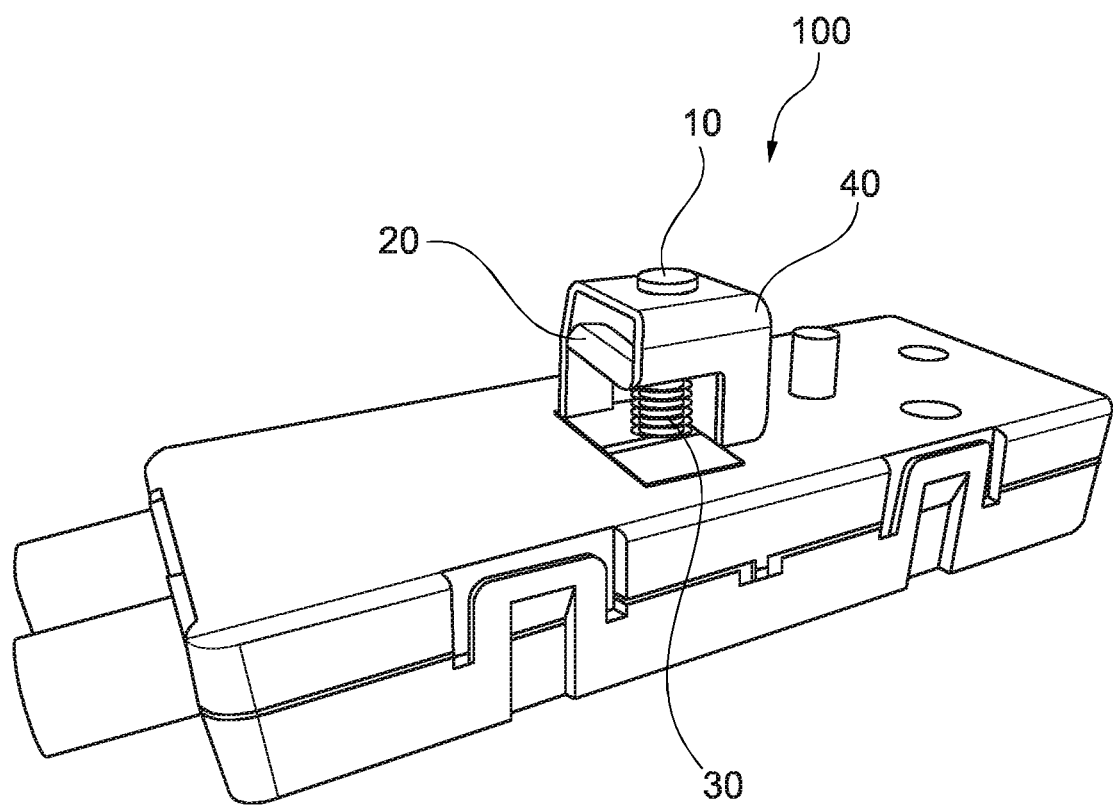
FIG. 1: is a schematic illustration of a housing device according to for explanation of the present invention.

FIG. 1 is a schematic illustration of a housing device 100 for explanation of the present invention. FIG. 1 shows the prior art, a housing with a "metal cage".

A bore 10 is formed in the metal cage 40.

The clamping element 20 must be inserted into the "metal cage" from the side and positioned at the top in the 0° position. This makes it possible for the screw element 30 to be inserted through the thread in the clamping element and the bore in the "metal cage", and this screwing-together can be performed in advance.

The clamping element 20 is pulled down by virtue of the screw element 30 being rotated further, and is rotated into a 45° position in order to lock. The module is pulled all the way down in the installation bore with the clamping element and brought into the 45° position.

Figure 2:
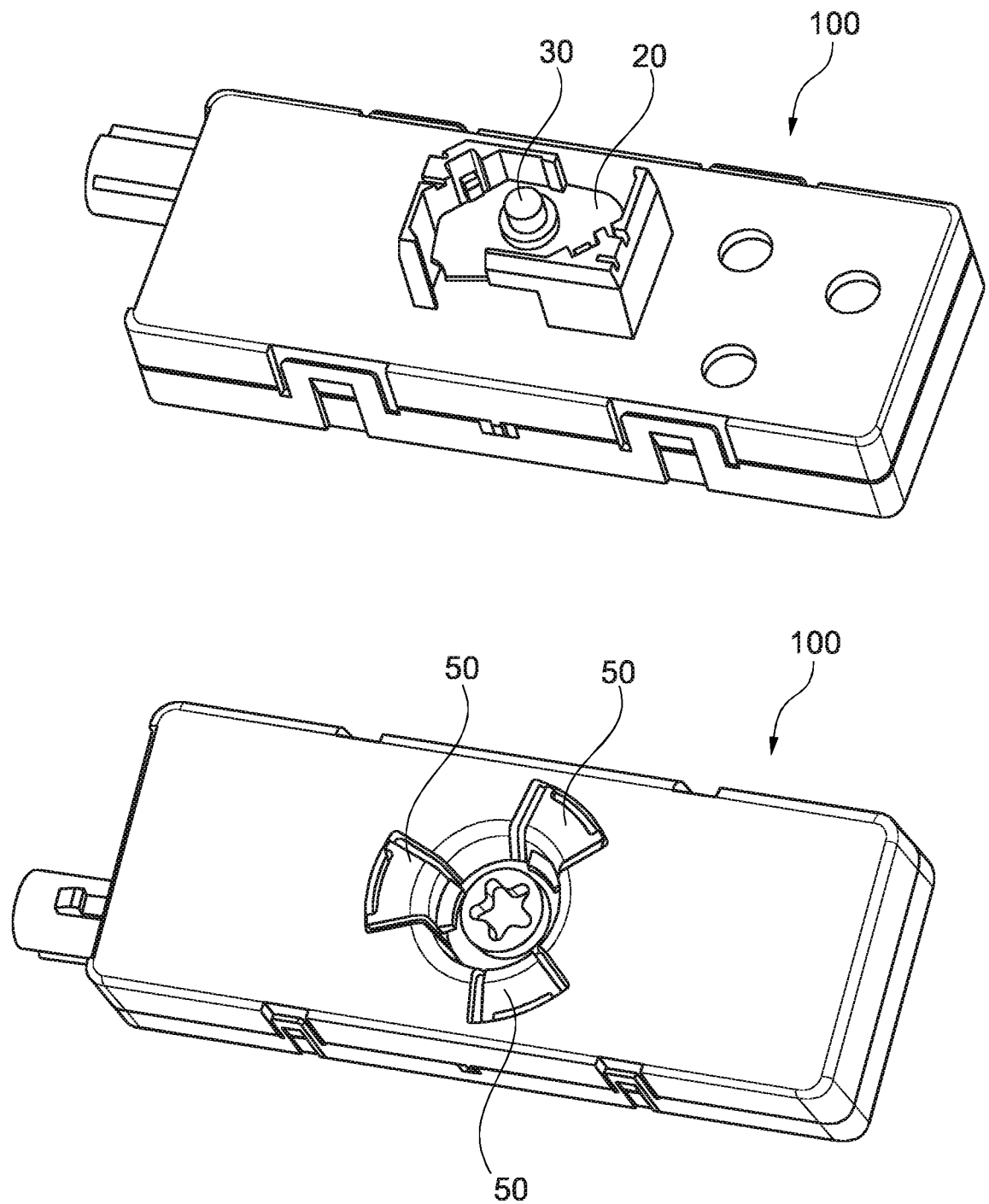
FIG. 2: is a schematic illustration of a plastics housing device according to an exemplary embodiment of the present invention.

FIG. 2 is a schematic illustration of a plastics housing device 100 according to an exemplary embodiment of the present invention.

A top side and a bottom side of the plastics housing device 100 are illustrated in FIG. 2.

In the illustration of the top side, the clamping element 20 and the screw element 30 are visible, and in the illustration of the bottom side of the plastics housing device 100, the positioning element 50, configured as three spring tabs in FIG. 2, is also visible.

Figure 3:
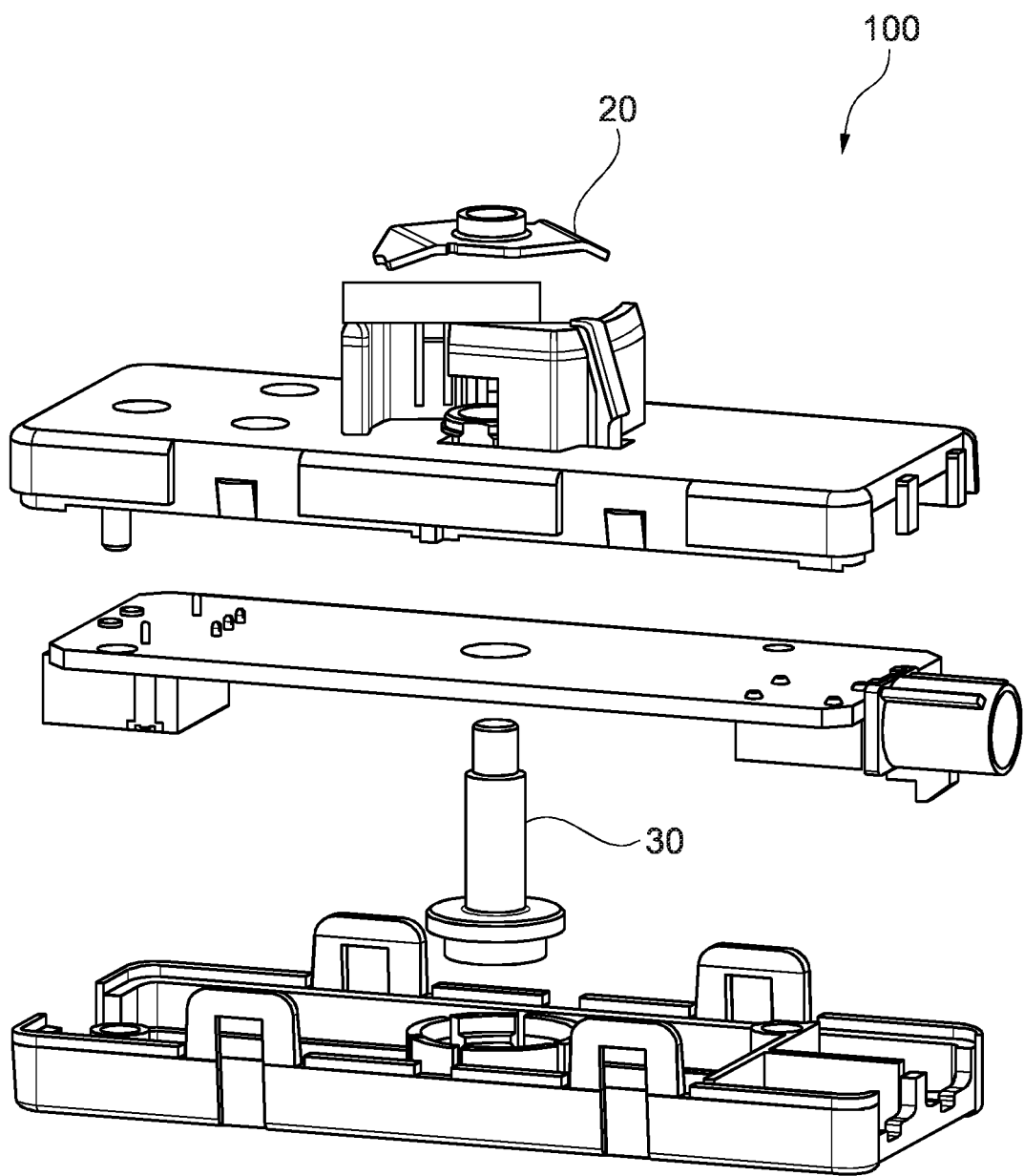
FIG. 3: is a schematic illustration of a plastics housing device according to an exemplary embodiment of the present invention.

FIG. 3 is a schematic illustration of a plastics housing device according to an exemplary embodiment of the present invention.

From top to bottom, FIG. 3 illustrates the following:

A clamping element 20 is illustrated at the top in FIG. 3. The plastics housing device 100 comprises a single-piece housing base. A circuit board as a carrier for electronic components is likewise illustrated in FIG. 3. FIG. 3 likewise shows a screw element 30 and a housing cover.

Figure 4:
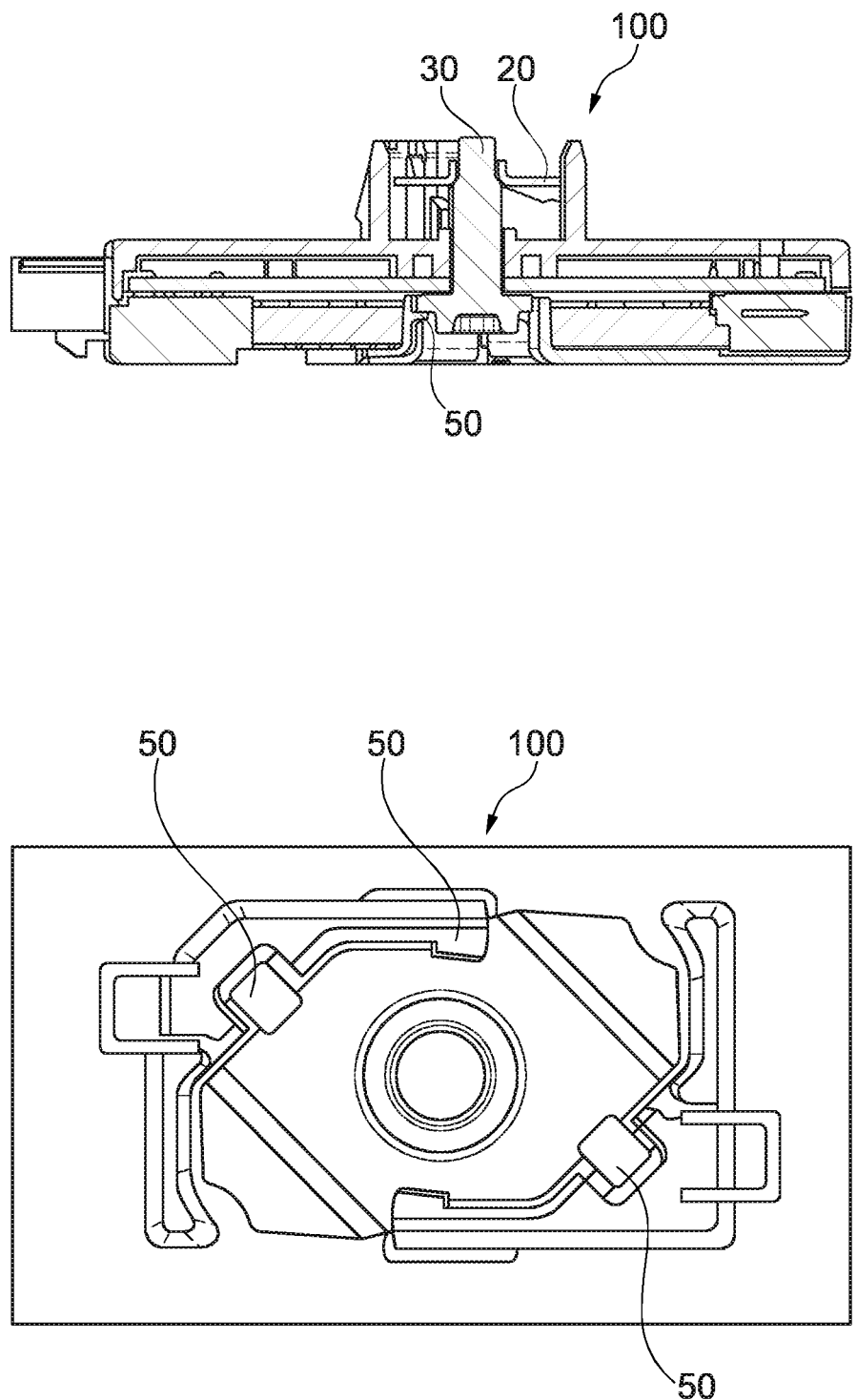
FIG. 4: is a schematic illustration of a plastics housing device according to an exemplary embodiment of the present invention.

FIG. 4 is a schematic illustration of a plastics housing device according to an exemplary embodiment of the present invention.

FIG. 4 shows a clamping element which is pressed against hooks 50 in the housing base.

The first thread turn of the screw element 30 is pressed against the clamping element 20.

The screw head lies on the housing cover.

Positioning elements 50 embodied as spring-loaded arms push the screw element 30 upward.

A rotation of the clamping element 20 is for example prevented in a neutral position.

FIG. 4 is a schematic illustration of a plastics housing device according to an exemplary embodiment of the present invention, wherein provision is made for hooks, as positioning element, to secure the clamping element.

The lower illustration in FIG. 4 shows the clamping element in the 0° position.

Figure 5:
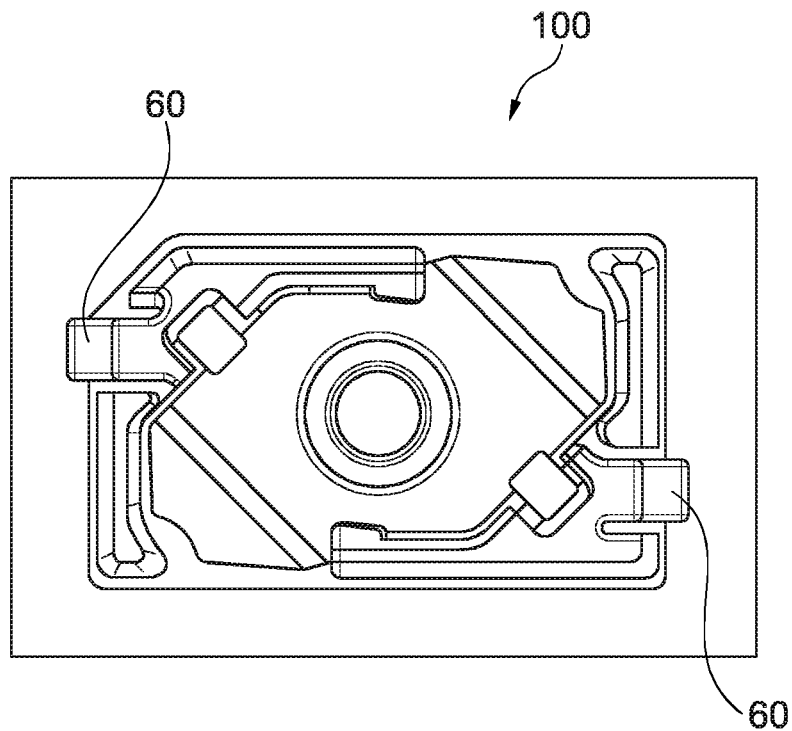
FIG. 5: is a schematic illustration of a plastics housing device according to an exemplary embodiment of the present invention.
Figure 5:
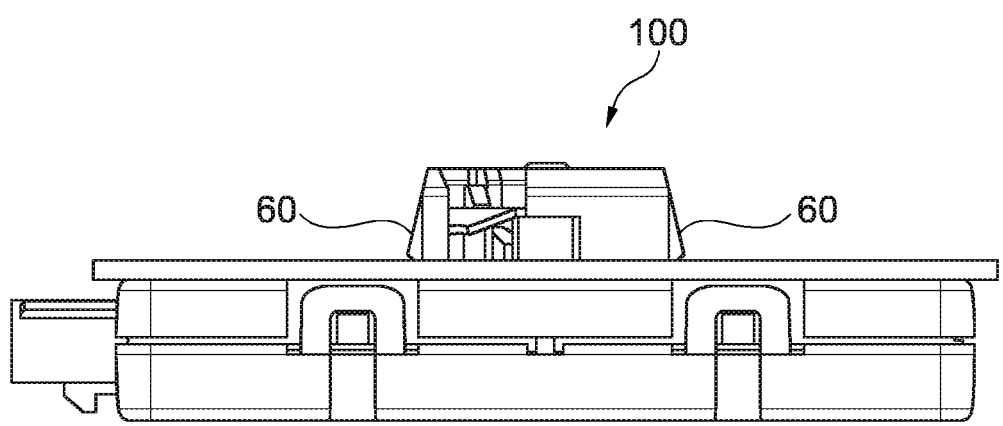

FIG. 5 is a schematic illustration of a plastics housing device according to an exemplary embodiment of the present invention.

FIG. 5 shows two hooks 60 with provisional retaining action.

Figure 6:
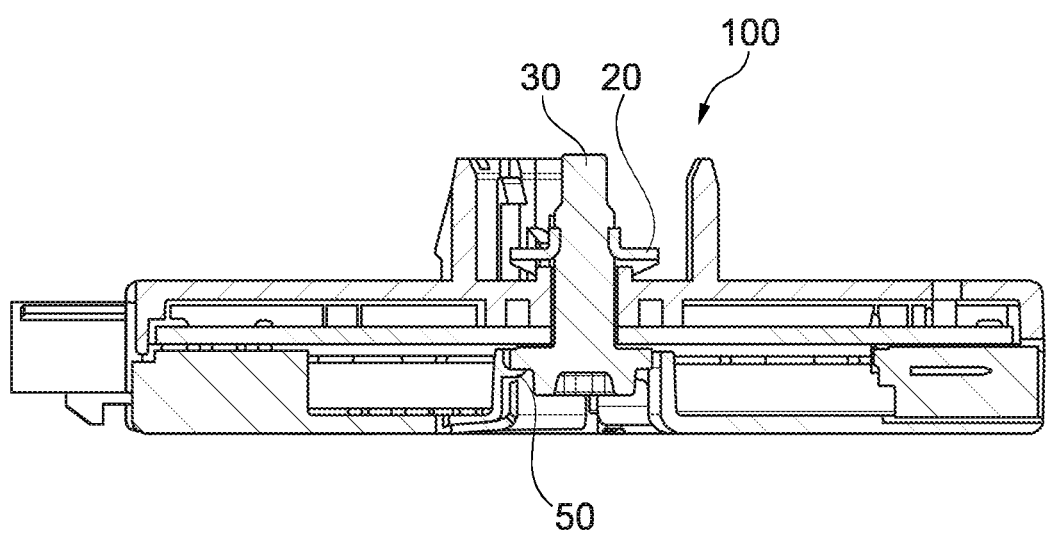
FIG. 6: is a schematic illustration of a plastics housing device according to an exemplary embodiment of the present invention.

FIG. 6 is a schematic illustration of a plastics housing device according to an exemplary embodiment of the present invention.

Figure 7:
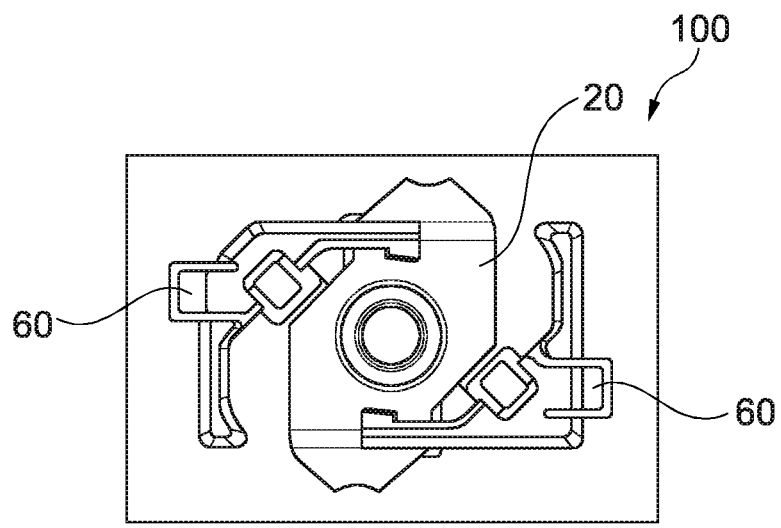
FIG. 7: is a schematic illustration of a plastics housing device according to an exemplary embodiment of the present invention.
Figure 7:
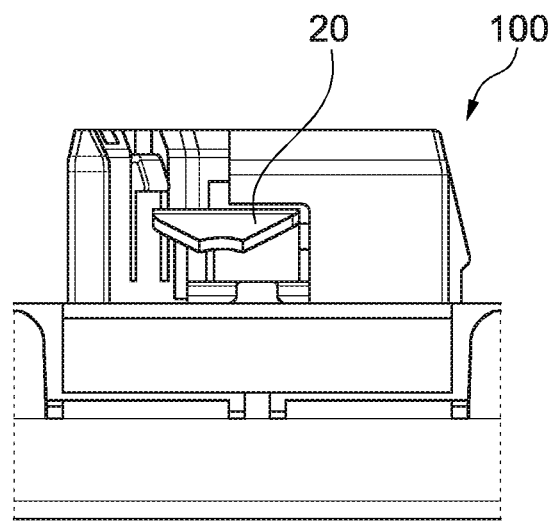

FIG. 7 is a schematic illustration of a plastics housing device according to an exemplary embodiment of the present invention.

FIG. 7 shows the clamping element in a 45° position.

Figure 8:
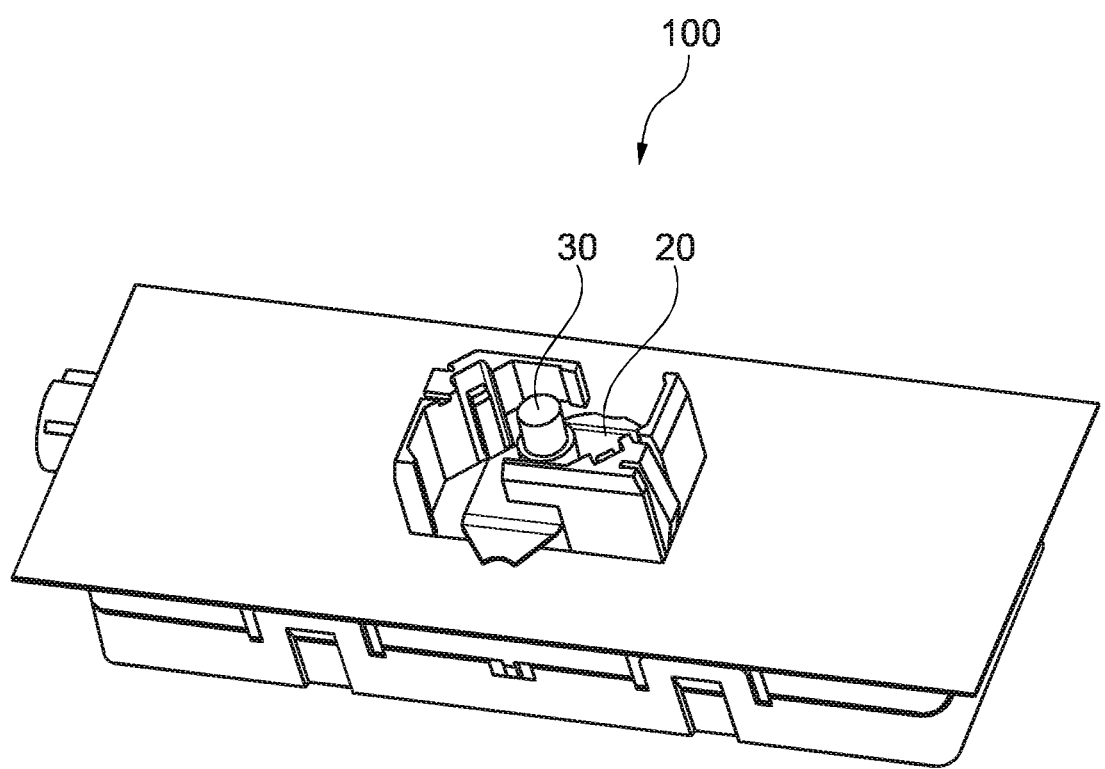
FIG. 8: is a schematic illustration of a plastics housing device according to an exemplary embodiment of the present invention.

FIG. 8 is a schematic illustration of a plastics housing device according to an exemplary embodiment of the present invention.

Figure 9:
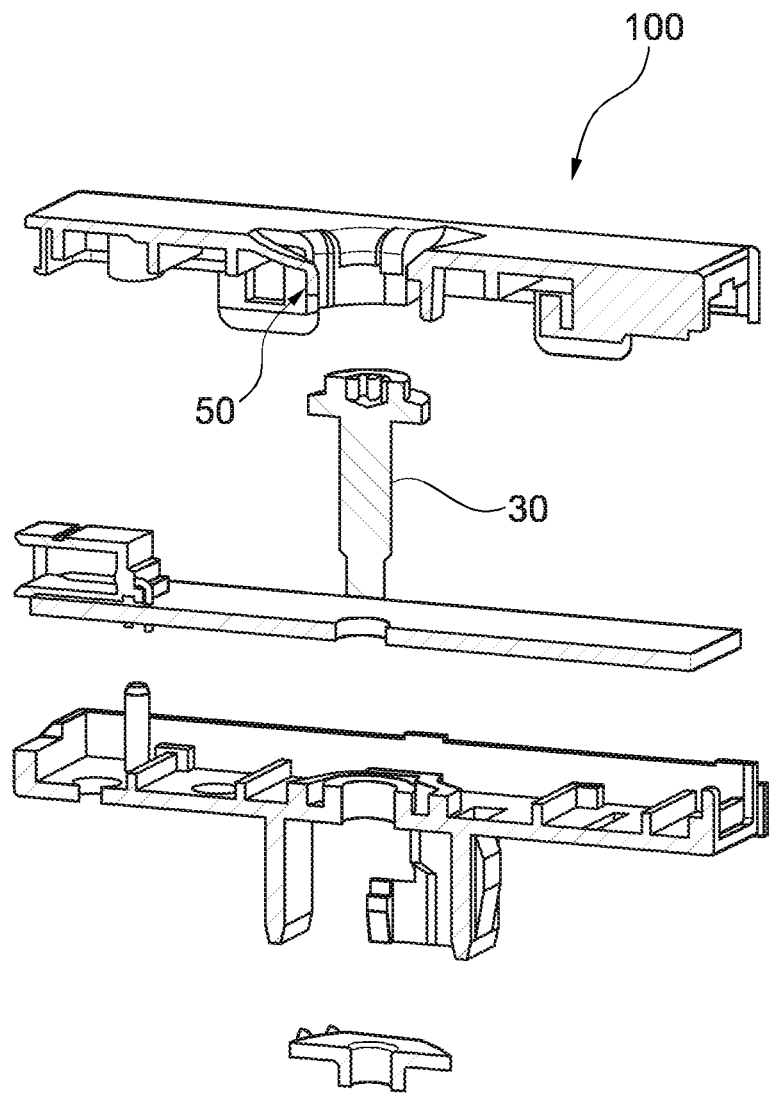
FIG. 9: is a schematic illustration of a plastics housing device according to an exemplary embodiment of the present invention.

FIG. 9 is a schematic illustration of a plastics housing device according to an exemplary embodiment of the present invention.

In the plastics housing device illustrated in FIG. 9, the at least one positioning element 50 is configured as a spring tab or a snap-action hook element.

Figure 10:
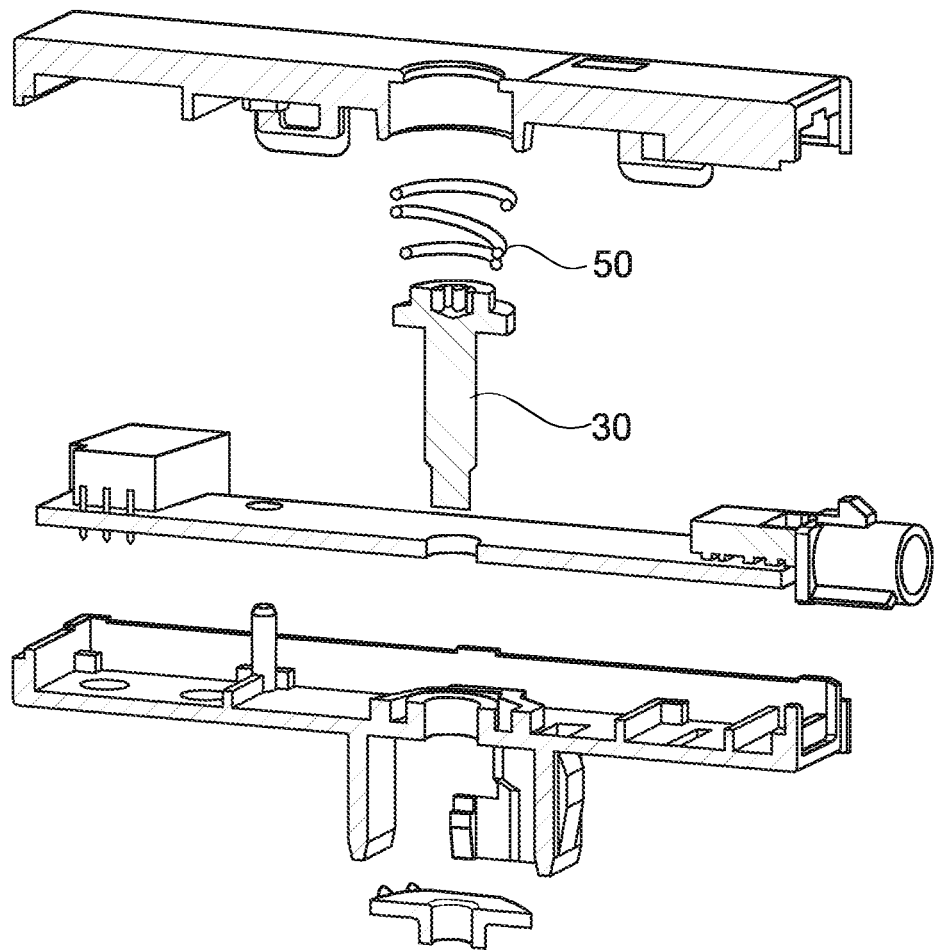
FIG. 10: is a schematic illustration of a plastics housing device according to an exemplary embodiment of the present invention.

FIG. 10 is a schematic illustration of a plastics housing device according to an exemplary embodiment of the present invention.

In the plastics housing device illustrated in FIG. 10, the at least one positioning element 50 is configured as a helical spring.

Although the present invention has been described above on the basis of preferred exemplary embodiments, it is not limited thereto but rather can be modified in a variety of ways. In particular, the present invention can be changed or modified in a variety of ways, without departing from the core of the invention.

In addition it will be noted that "comprising" and "having" do not exclude any other elements or steps, and "a" or "an" does not exclude a plurality.

Furthermore, it will be noted that features or steps that have been described with reference to one of the above exemplary embodiments can also be used in combination with other features or steps of other exemplary embodiments described above. Reference signs in the claims should not be considered to be limiting.

The invention claimed is:

1. A plastic housing device for indirect screw connection for a motor vehicle, wherein the plastic housing device comprises:
    at least one positioning element;
    a clamping element; and
    a screw element;
    wherein the at least one positioning element is configured to hold the clamping element in position in form-fitting manner;
    wherein the screw element is configured to be pressed against the clamping element by the at least one positioning element and thereby cause a rotation of the clamping element;
    wherein the clamping element is configured to clamp the plastic housing device to a metal panel via the rotation, and
    wherein the screw element is configured to engage with spring tabs when rotated.

2. The plastic housing device as claimed in claim 1, wherein the plastic housing device is configured to permit installation of modules housed in the plastic housing device into the motor vehicle.

3. The plastic housing device as claimed in claim 1, wherein the screw element has a screw head that lies on a plastic housing device cover.

4. The plastic housing device as claimed in claim 1, wherein the plastic housing device is configured to push the screw element in one direction.

5. The plastic housing device as claimed in claim 1, wherein the at least one positioning element is configured as a helical spring.

6. A plastic housing device for indirect screw connection for a motor vehicle, wherein the plastic housing device comprises:
   at least one positioning element;
   a clamping element; and
   a screw element;
   wherein the at least one positioning element is configured to hold the clamping element in position in form-fitting manner;
   wherein the screw element is configured to be pressed against the clamping element by the at least one positioning element and thereby cause a rotation of the clamping element;
   wherein the clamping element is configured to clamp the plastic housing device to a metal panel via the rotation, and
   wherein the plastic housing device is configured such that tolerances are compensated for by a correspondingly adapted travel of spring tabs attached to the plastic housing device.

7. A plastic housing device for indirect screw connection for a motor vehicle, wherein the plastic housing device comprises:
   at least one positioning element;
   a clamping element; and
   a screw element;
   wherein the at least one positioning element is configured to hold the clamping element in position in form-fitting manner;
   wherein the screw element is configured to be pressed against the clamping element by the at least one positioning element and thereby cause a rotation of the clamping element;
   wherein the clamping element is configured to clamp the plastic housing device to a metal panel via the rotation, and
   wherein the at least one positioning element is configured as a spring tab.

* * * * *